United States Patent
Barabash et al.

(10) Patent No.: US 11,899,935 B2
(45) Date of Patent: Feb. 13, 2024

(54) SYSTEM AND METHOD FOR USER SPACE NVME-OVER-RDMA HOST LIBRARY

(71) Applicant: EMC IP Holding Company, LLC, Hopkinton, MA (US)

(72) Inventors: Alexander Barabash, Rehovot (IL); Eldad Zinger, Ra'anana (IL); Leonid Ravich, Ra'anana (IL); Or Idgar, Kfar Saba (IL); Vitaly Zharkov, Modiin (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 28 days.

(21) Appl. No.: 17/233,148

(22) Filed: Apr. 16, 2021

(65) Prior Publication Data

US 2022/0334717 A1 Oct. 20, 2022

(51) Int. Cl.
*G06F 3/06* (2006.01)

(52) U.S. Cl.
CPC ............ *G06F 3/061* (2013.01); *G06F 3/0655* (2013.01); *G06F 3/0689* (2013.01)

(58) Field of Classification Search
CPC ....... G06F 3/061; G06F 3/0655; G06F 3/0689
See application file for complete search history.

(56) References Cited

U.S. PATENT DOCUMENTS

| | | | |
|---|---|---|---|
| 2015/0089009 A1* | 3/2015 | Tsirkin | G06F 12/1081 709/212 |
| 2017/0149920 A1* | 5/2017 | Sammatshetti | G06F 3/061 |
| 2019/0079895 A1* | 3/2019 | Kim | G06F 13/4282 |
| 2020/0225874 A1* | 7/2020 | Nimmagadda | G06F 3/0659 |
| 2020/0293465 A1* | 9/2020 | Yang | H04L 49/70 |
| 2020/0401546 A1* | 12/2020 | Mehta | G06F 13/124 |
| 2022/0058146 A1* | 2/2022 | Balakrishnan | G06F 3/067 |

OTHER PUBLICATIONS

NVM Express™ over Fabrics Revision 1.1; Oct. 22, 2019; http://nvmexpress.org; pp. 1-83.
NVM Express™ Revision 1.4b; Sep. 21, 2020; http://nvmexpress.org; pp. 1-406.

* cited by examiner

*Primary Examiner* — Nanci N Wong
(74) *Attorney, Agent, or Firm* — Brian J. Colandreo; Heath M. Sargeant; Holland & Knight LLP

(57) ABSTRACT

A method, computer program product, and computer system for exposing, by a user block layer of a computing device, a storage device as a block device to an application associated with an IO request. A Non-Volatile Memory Express (NVMe) protocol layer of the computing device may expose a NVMe storage device associated with the IO request to the user block layer. A NVMe-over-RDMA layer of the computing device may create a NVMe RDMA queue for the IO request to be processed.

15 Claims, 11 Drawing Sheets

SYSTEM AND METHOD FOR USER SPACE NVME-OVER-RDMA HOST LIBRARY

BACKGROUND

Non-Volatile Memory Express over Fabrics (NVMeoF) is a storage protocol in storage solutions, such as common storage appliances/systems. Generally, the NVMeOf target stack is implemented on the storage side and the host stack is implemented on the client side. There are scenarios in which the host stack may be required internally. For example, storage solutions with Disk Array Enclosures (DAEs), where DAE is a NVMeOf target and the storage appliance is the host. Another example may be internal services accessing the frontend, such as software defined network attached (SDNAS), where the SDNAS is the NVMeOf host.

BRIEF SUMMARY OF DISCLOSURE

In one example implementation, a method, performed by one or more computing devices, may include but is not limited to exposing, by a user block layer of a computing device, a storage device as a block device to an application associated with an IO request. A Non-Volatile Memory Express (NVMe) protocol layer of the computing device may expose a NVMe storage device associated with the IO request to the user block layer. A NVMe-over-RDMA layer of the computing device may create a NVMe RDMA queue for the IO request to be processed.

One or more of the following example features may be included. The user block layer may obtain an IO descriptor list and a destination namespace associated with the IO request. The user block layer may pre-register application memory used for IO data associated with the IO request. The NVMe protocol layer may link a namespace to a controller to access the NVMe storage device. Creating the NVMe RDMA queue may include creating, by the NVMe-over-RDMA layer, an RDMA queue. The NVMe-over-RDMA layer may destroy the RDMA queue. The NVMe-over-RDMA layer may submit an RDMA work request associated with the IO request to the RDMA queue.

In another example implementation, a computing system may include one or more processors and one or more memories configured to perform operations that may include but are not limited to exposing, by a user block layer of a computing device, a storage device as a block device to an application associated with an IO request. A Non-Volatile Memory Express (NVMe) protocol layer of the computing device may expose a NVMe storage device associated with the IO request to the user block layer. A NVMe-over-RDMA layer of the computing device may create a NVMe RDMA queue for the IO request to be processed.

One or more of the following example features may be included. The user block layer may obtain an IO descriptor list and a destination namespace associated with the IO request. The user block layer may pre-register application memory used for IO data associated with the IO request. The NVMe protocol layer may link a namespace to a controller to access the NVMe storage device. Creating the NVMe RDMA queue may include creating, by the NVMe-over-RDMA layer, an RDMA queue. The NVMe-over-RDMA layer may destroy the RDMA queue. The NVMe-over-RDMA layer may submit an RDMA work request associated with the IO request to the RDMA queue.

In another example implementation, a computer program product may reside on a computer readable storage medium having a plurality of instructions stored thereon which, when executed across one or more processors, may cause at least a portion of the one or more processors to perform operations that may include but are not limited to exposing, by a user block layer of a computing device, a storage device as a block device to an application associated with an IO request. A Non-Volatile Memory Express (NVMe) protocol layer of the computing device may expose a NVMe storage device associated with the IO request to the user block layer. A NVMe-over-RDMA layer of the computing device may create a NVMe RDMA queue for the IO request to be processed.

One or more of the following example features may be included. The user block layer may obtain an IO descriptor list and a destination namespace associated with the IO request. The user block layer may pre-register application memory used for TO data associated with the IO request. The NVMe protocol layer may link a namespace to a controller to access the NVMe storage device. Creating the NVMe RDMA queue may include creating, by the NVMe-over-RDMA layer, an RDMA queue. The NVMe-over-RDMA layer may destroy the RDMA queue. The NVMe-over-RDMA layer may submit an RDMA work request associated with the IO request to the RDMA queue.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
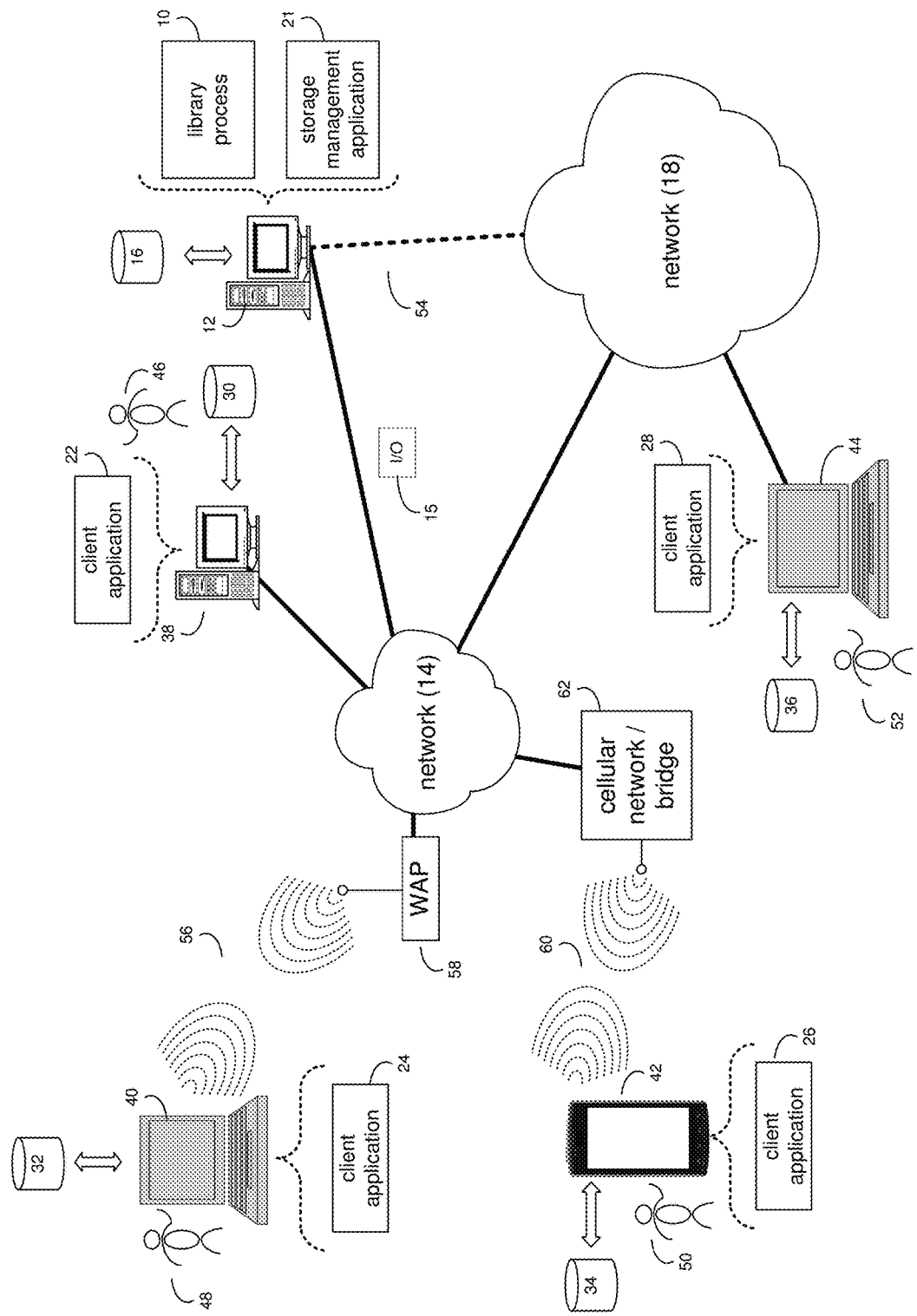
FIG. 1 is an example diagrammatic view of a library process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown library process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a library process, such as library process 10 of FIG. 1, may expose, by a user block layer of a computing device, a storage device as a block device to an application associated with an IO request. A Non-Volatile Memory Express (NVMe) protocol layer of the computing device may expose a NVMe storage device associated with the IO request to the user block layer. A NVMe-over-RDMA layer of the computing device may create a NVMe RDMA queue for the IO request to be processed.

In some implementations, the instruction sets and subroutines of library process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, library process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, library process 10 and/or storage management application 21 may be accessed via one or more of client applications 22, 24, 26, 28. In some implementations, library process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within library process 10, a component of library process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of library process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of library process 10 (and vice versa). Accordingly, in some implementations, library process 10 may be a purely server-side application, a purely client-side application, or a hybrid server-side/client-side application that is cooperatively executed by one or more of client applications 22, 24, 26, 28 and/or library process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, library process 10, and storage management application 21, taken singly or in any combination, may effectuate some or all of the same functionality, any description of effectuating such functionality via one or more client applications 22, 24, 26, 28, library process 10, storage management application 21, or combination thereof, and any described interaction(s) between one or more of client applications 22, 24, 26, 28, library process 10, storage management application 21, or combination thereof to effectuate such functionality, should be taken as an example only and not to limit the scope of the disclosure.

In some implementations, one or more of users 46, 48, 50, 52 may access computer 12 and library process 10 (e.g., using one or more of client electronic devices 38, 40, 42, 44) directly through network 14 or through secondary network 18. Further, computer 12 may be connected to network 14 through secondary network 18, as illustrated with phantom link line 54. Library process 10 may include one or more user interfaces, such as browsers and textual or graphical user interfaces, through which users 46, 48, 50, 52 may access library process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
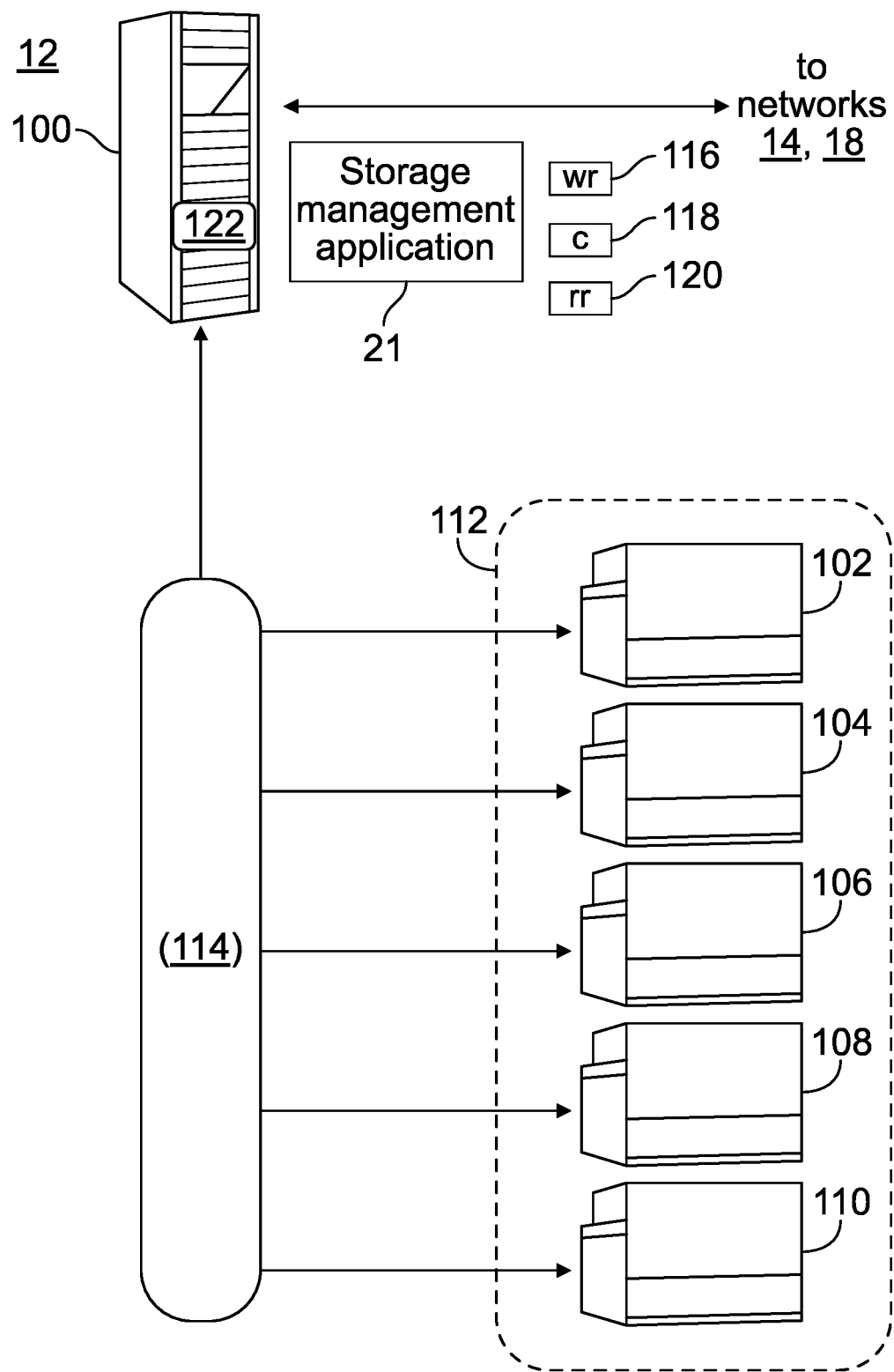
FIG. 2 is an example diagrammatic view of a storage system of FIG. 1 according to one or more example implementations of the disclosure.
Figure 3:
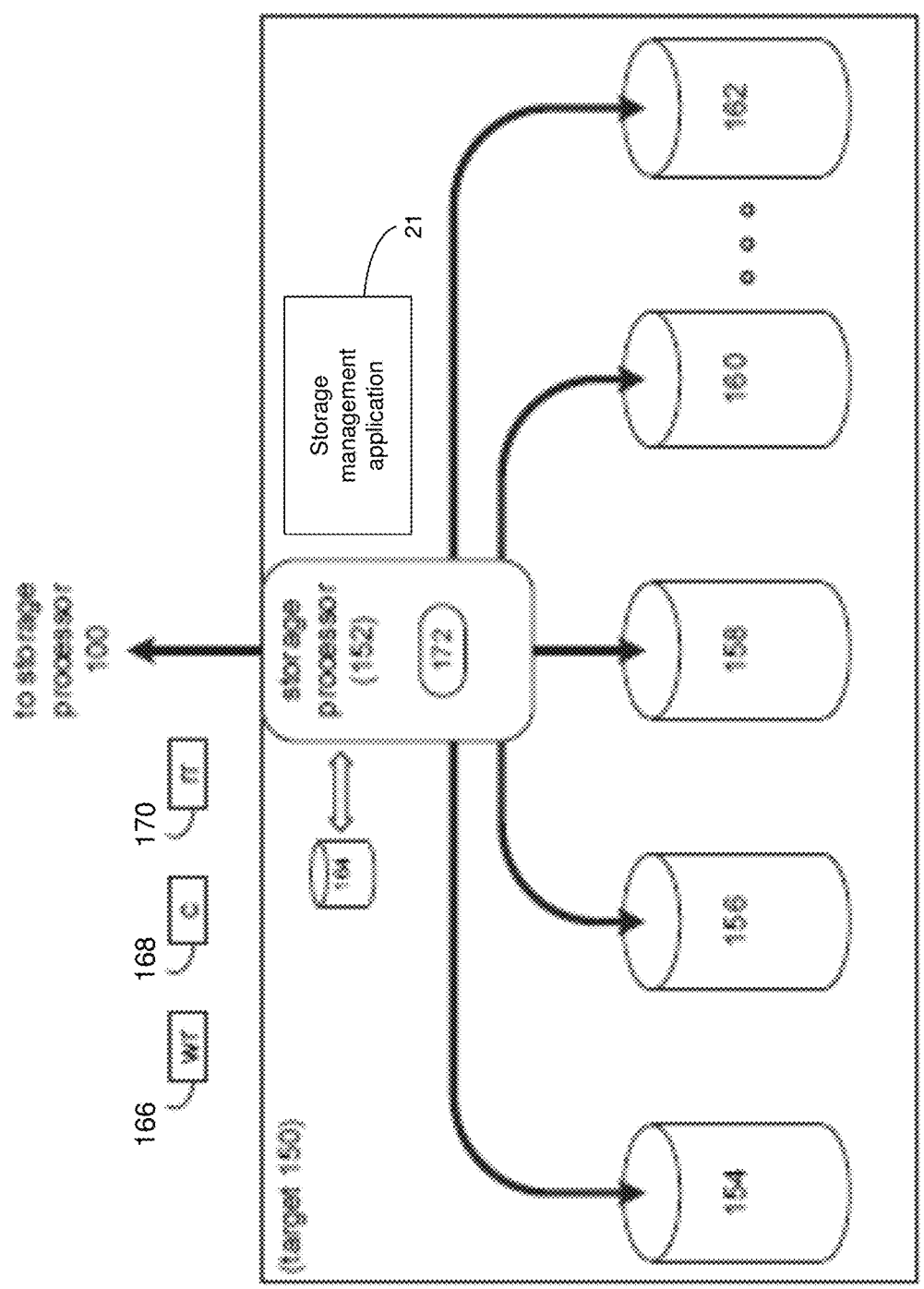
FIG. 3 is an example diagrammatic view of a storage target of FIG. 1 according to one or more example implementations of the disclosure.
Figure 4:
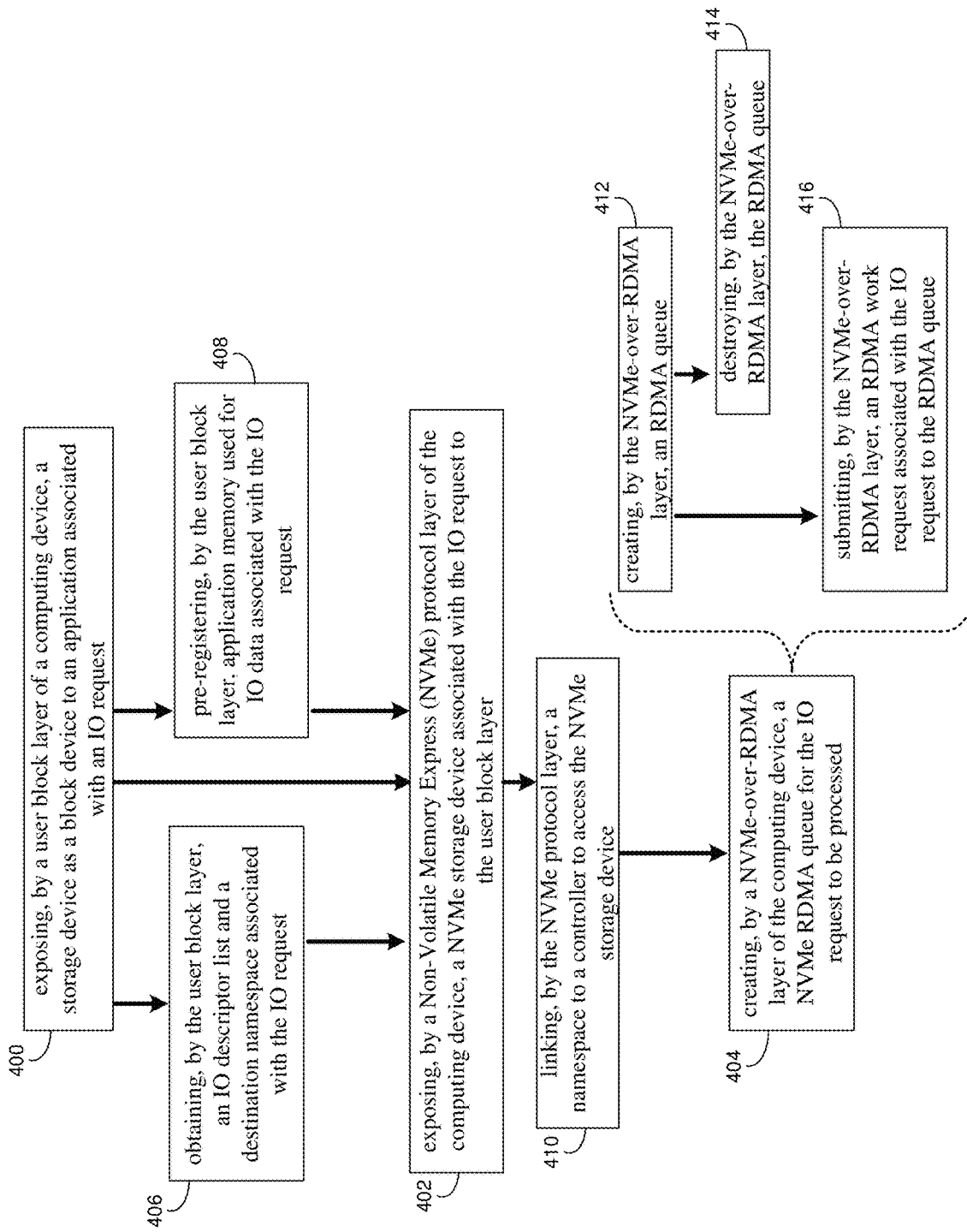
FIG. 4 is an example flowchart of a library process according to one or more example implementations of the disclosure.
Figure 5:
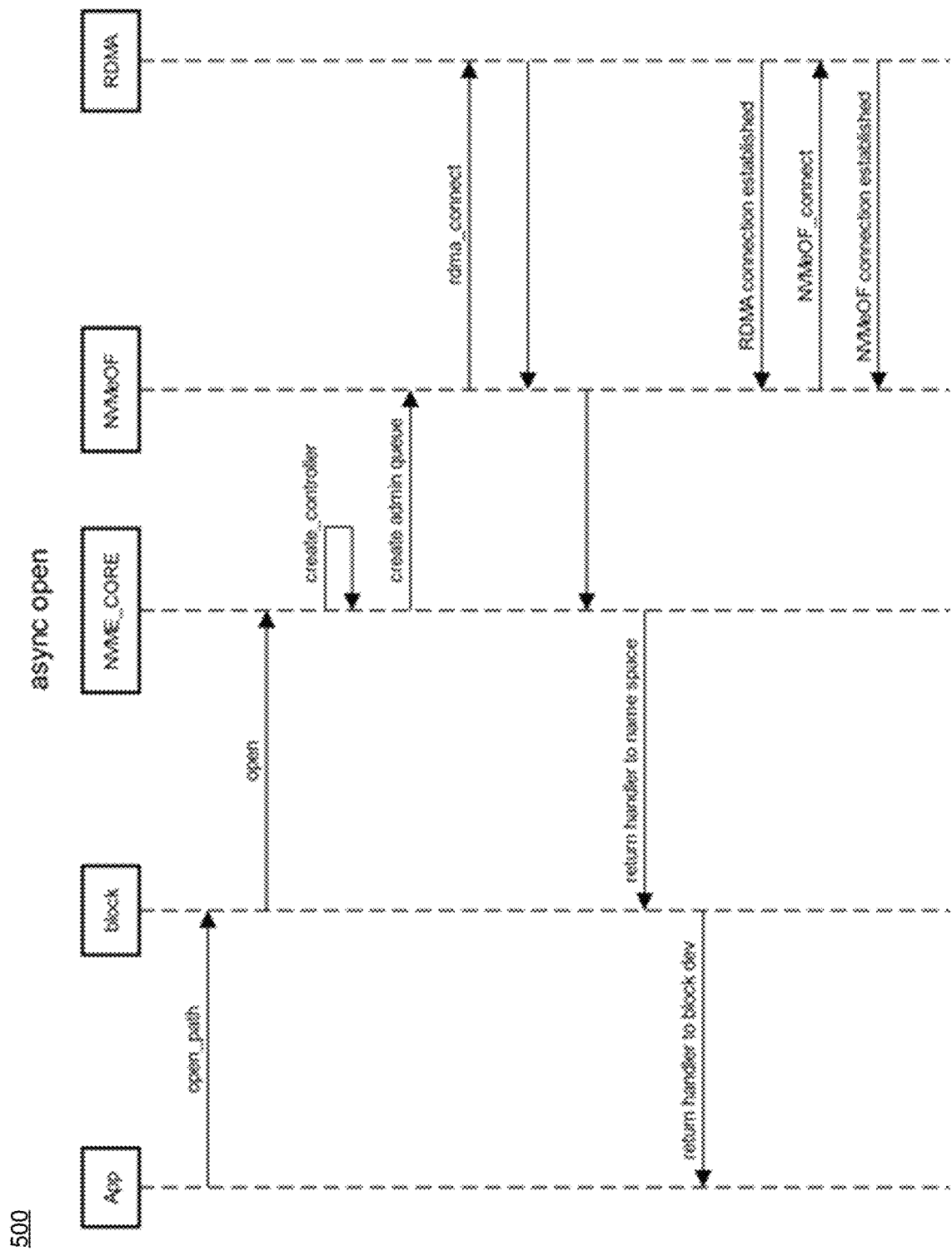
FIG. 5 is an example flowchart of a library process according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™system offered by Dell EMC™ of Hopkinton, MA.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or library process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, MA. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, Non-Volatile Memory Express over Fabrics (NVMeoF) is a storage protocol in storage solutions, such as common storage appliances/systems. Generally, the NVMeOf target stack is implemented on the storage side and the host stack is implemented on the client side. There are scenarios in which the host stack may be required internally. For example, storage solutions with Disk Array Enclosures (DAEs), where DAE is a NVMeOf target and the storage appliance is the host. Another example may be internal services accessing the frontend, such as software defined network attached (SDNAS), where the SDNAS is the NVMeOf host.

In all those example scenarios, the host implementation may be chosen and should require such with optimized performance. Generally, NVMEoF supports multiple transport layers, such as Remote Direct Memory Access (RDMA), TCP and Fibre channel. For brevity, in this library the discussion involves only RDMA. An example and non-limiting issue with this is a lack of a performance-wise optimized NVMEoF host solution, and lack of easy integration to an existing data path software stack.

Some Linux solutions to the above problem may involve having a native solution (NVME kernel module) which is based on a Linux kernel stack and block layer, but this general solution has a high CPU utilization high latency and low scalability. This solution may be easily integrated to any application, but performance will be degraded.

Another example solution is SPDK an open-source user space solution based on the Data Plane Development Kit (DPDK) framework with high performance capabilities, but designed as standalone process. Integrating SPDK into a DP process may require heavy redesign, passing IOs from the DP process to SPDK process may also degrade performance.

Therefore, as will be discussed in greater detail below, the present disclosure may use a multi-platform user-space (kernel bypass) NVME over RDMA library which may be integrated into any (or nearly any) software stack with RDMA capabilities. Example and non-limiting advantages of the present disclosure may include, e.g.: (1) better performance compared to the above Linux solution due to, e.g.: (a) Kernel bypass, (b) Memory pre-registration, (c) Optimized thin block layer, (d) Exposing more versatile lower layer functionality, compared to a well-defined and generic kernel's API, (e) providing a scaleable solution, and (2) better integration abilities compared to the above-noted SPDK solution due to, e.g., (a) Building as a library with a generic API, (b) Abstraction of the environment layer, and (c) being designed as a layered solution.

Generally, an application may be broadly described as a software stack that may use the present disclosure and calls its API. A block device may be broadly described as a handler to namespace, that may support reading and (optionally) writing data in fixed-size blocks, sectors, or clusters. A namespace may broadly be described as a quantity of non-volatile memory that may be formatted into logical blocks. When formatted, a namespace of size n may be a collection of logical blocks with logical block addresses from 0 to (n−1). A controller may broadly be described as a device that may implement I/O queues and may be intended to be used to access, e.g., a non-volatile memory storage medium.

The Library Process:

As discussed above and referring also at least to the example implementations of FIGS. 4-11, library process 10 may expose 400 (e.g., via a user block layer of a computing device) a storage device as a block device to an application associated with an IO request. Library process 10 may expose 402 (e.g., via a Non-Volatile Memory Express (NVMe) protocol layer of the computing device) a NVMe storage device associated with the IO request to the user block layer. Library process 10 may create 404 (e.g., via a NVMe-over-RDMA layer of the computing device) a NVMe RDMA queue for the IO request to be processed.

As will be discussed below, the present disclosure involves a layered software stack design. It will be appreciated that although the present disclosure may support different low-level storage device types and transports, only NVMEoF RDMA is described for brevity and ease of illustration.

As will also be discussed in greater detail, in some implementations, library process 10 may expose 400 (e.g., via a user block layer of a computing device) a storage device as a block device to an application associated with an IO request. For example, and referring at least to the example implementations of FIG. 5 and FIG. 6, an example alternative/additional flowchart 500 of library process 10, and an example layered software stack design 600 are shown, and will be used in the context of the present disclosure. In the example, one layer of the layered software stack design may include a block layer (i.e., a user block layer). This may include an interface layer exposing a storage device as a block device to an application, exposing unified API for all supported block device backends, and implement common mechanisms for block device backends.

As will also be discussed in greater detail, in some implementations, library process 10 may expose 402 (e.g., via a Non-Volatile Memory Express (NVMe) protocol layer of the computing device) a NVMe storage device associated with the IO request to the user block layer. For instance, another layer of the layered software stack design may include a NVMe core layer (protocol layer). This may be a type of block layer backend exposing NVMe storage devices to the user block layer. The NVMe core layer may support multiple transports such as, e.g., PCI, RDMA, TCP or FC, etc.

As will also be discussed in greater detail, in some implementations, library process 10 may create 404 (e.g., via a NVMe-over-RDMA layer of the computing device) a NVMe RDMA queue for the IO request to be processed. For instance, another layer of the layered software stack design may include a NVMeOf RDMA layer (transport). This may be a type of NVMe transport layer based on RDMA hardware connectivity.

Figure 6:
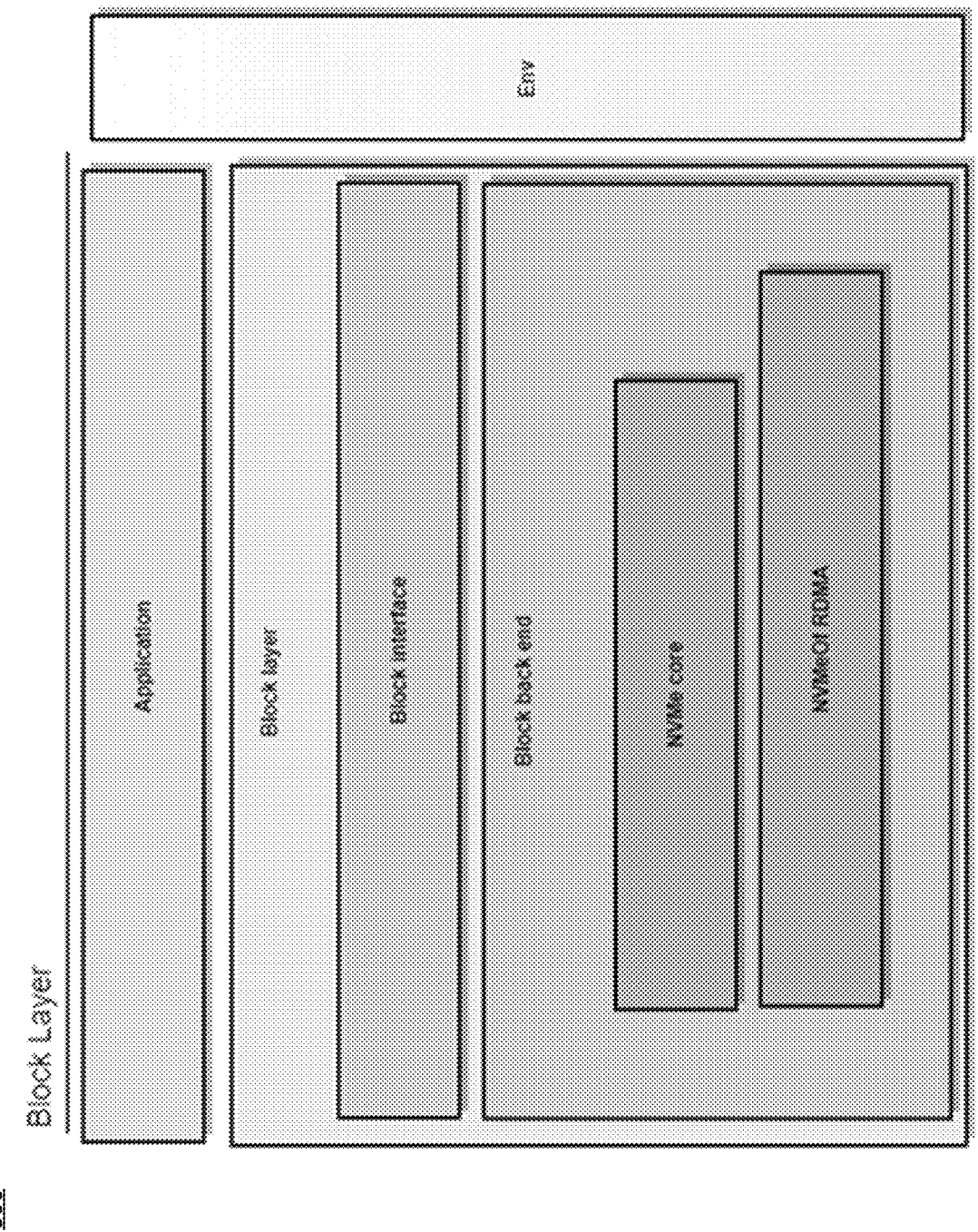
FIG. 6 is an example diagrammatic view of a layered software stack design used by a library process according to one or more example implementations of the disclosure.

As shown in FIG. 6, there is shown a full layered path to a storage device namespace relevant for each layer, e.g.: User Block layer—backend type set specific backend callbacks for this path; NVMe core layer—subsystem (NQN), namespace (NSID); NVMeOf RDMA layer—transport address (RDMA IP) and transport service id (RDMA port).

Figure 7:
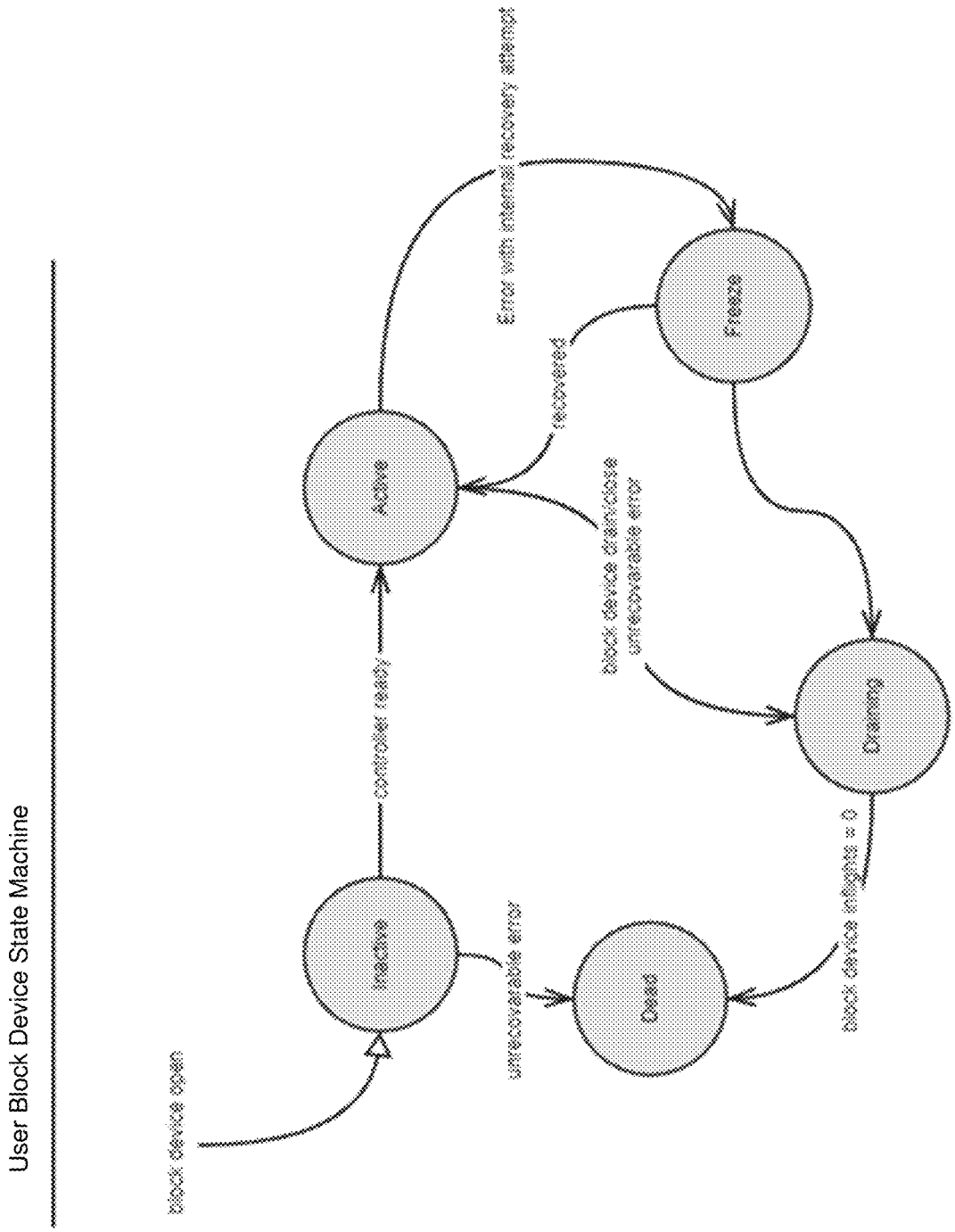
FIG. 7 is an example diagrammatic view of a user block device state machine used by a library process according to one or more example implementations of the disclosure.

Referring to the example implementation of FIG. 7, an example user block device state machine 700 associated with library process 10 is shown, and described below.

Inactive—this may be the first state of an opened block device, not ready to accept IOs yet. The next step will be either "Active" or "dead".

Active—in this state, the device is ready to accept IOs.

Freeze—in this state, the device temporary may be out of service, and the IOs may be pushed to the internal freeze queue and may be submitted when moving to the open state or canceled when moving to the dead state.

Draining—in this state, the device rejects the new IOs but allows the application to poll for in-flight commands. When there are no in-flight commands, the device may be moved automatically to the "dead" state.

Dead—in this state, the device may be unavailable. Any submitted IOs may fail, and this device should be closed by the application.

Regarding the user block layer functionality:

Open—This gets "path" to the required user block device, where such path may depend on specific low-level transport. This call may be non-blocking, and after return, the user block device may still be inaccessible, the callback function may be passed to notify the namespace state change. In some implementations, it may depend on the path type block back end callback that will be assigned. In some implementations, the transport specific implementation may be implemented by the user block backend layer.

Close—This may close the user block device. If the device is not dead, it may be "killed" (moved to a draining state) and block until the device is dead, then may call the lower layer close callback and free all resources allocated. To prevent close from blocking, block device should be drained before the close is called. After the close, the returned block device handler should not be used.

In some implementations, library process 10 may obtain 406 (e.g., via the user block layer) an IO descriptor list and a destination namespace associated with the IO request. For example: Submit—this may submit an asynchronous IO request to a lower layer, obtains an IO descriptor list and a destination namespace. In some implementations, each IO descriptor may include command ID, IO vector, destination Logical Block Address (LBA) and op-code. In some implementations, it may also arm a timeout for each application IO, and may split the IO. For instance, if there is a low level IO size limit, it may split one application IO to multiple low-level IOs. In some implementations, library process 10 may enqueue IOs in a pending queue in case of a low-level queue being full and may resubmit it to a block backend layer later.

Poll—Polls may be a lower layer for IO submitted completions. It may fill an array of completion descriptors. Each descriptor may contain IO an completion status and an IO ID which may be used by an application to match sent IOs to its completion. In the case of a split IO, a completion to an application may be generated only when all parts are completed. The IOs may be submitted from a pending queue.

In some implementations, library process 10 may pre-register 408 (e.g., via the user block layer) application memory used for IO data associated with the IO request. For example: Memory registration—IO memory may be passed to a block layer backend and may be accessed asynchronously by hardware, therefore physical memory should be pinned, and virtual to physical address translation should be prepared to avoid copying to a bounce buffer, avoiding such pinning or any other memory preparations during the IO flows. Application memory used for IO data may be required to be pre-registered. Such registration implementation may depend on the user block layer backend. To support multiple memory region registrations, for each application memory registration a hint may be returned to an application. In submitting an IO, an application may attach it to the IO descriptor to make lookups more efficient.

Regarding User Block layer error handling:

IO timeout—In the example case where an IO timeout is triggered before the IO is completed, library process 10 may poll the user block layer. For instance, library process 10 may (1) move the block device to freeze, (2) block new application IOs, putting it on a "block queue", and (3) call the lower layer timeout handler. If the lower layer succeeds, all in-flight commands may be completed (with error or success status), then all IOs on the "block queue" may be sent. If the lower layer fails, the device state may be changed to drain and all IOs enqueued in the "block queue" may be completed (with error or success status).

Figure 8:
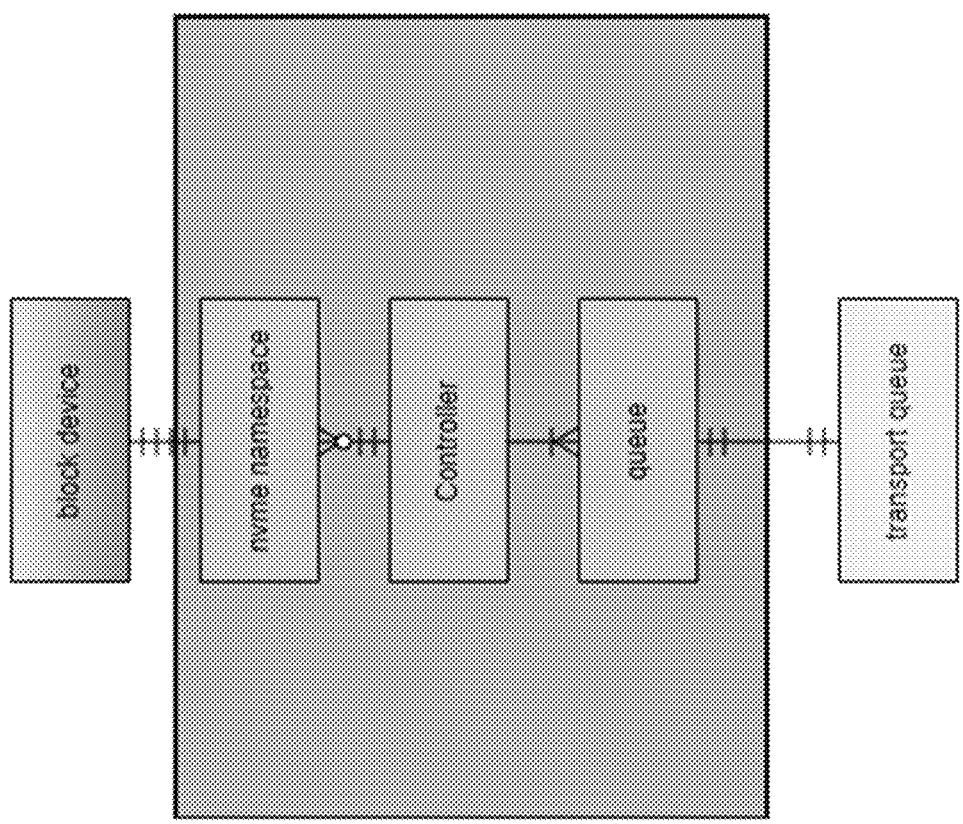
FIG. 8 is an example diagrammatic view of NVMe core objects used by a library process according to one or more example implementations of the disclosure.

Referring to the example implementation of FIG. 8, an example of NVMe core objects 800 of the NVMe core layer associated with library process 10 is shown, and described below.

NVMe namespace—this may be the object describing the NVMe namespace, where each higher layer block device linked/contains one.

NVMe controller—this may be a container object (e.g., a mirroring target container) for all NVMe IO queues and admin queue. In some implementations, it may be shared by multiple namespaces. The number of queues in each controller may depend on targets capabilities and configured queue topology.

Figure 10:
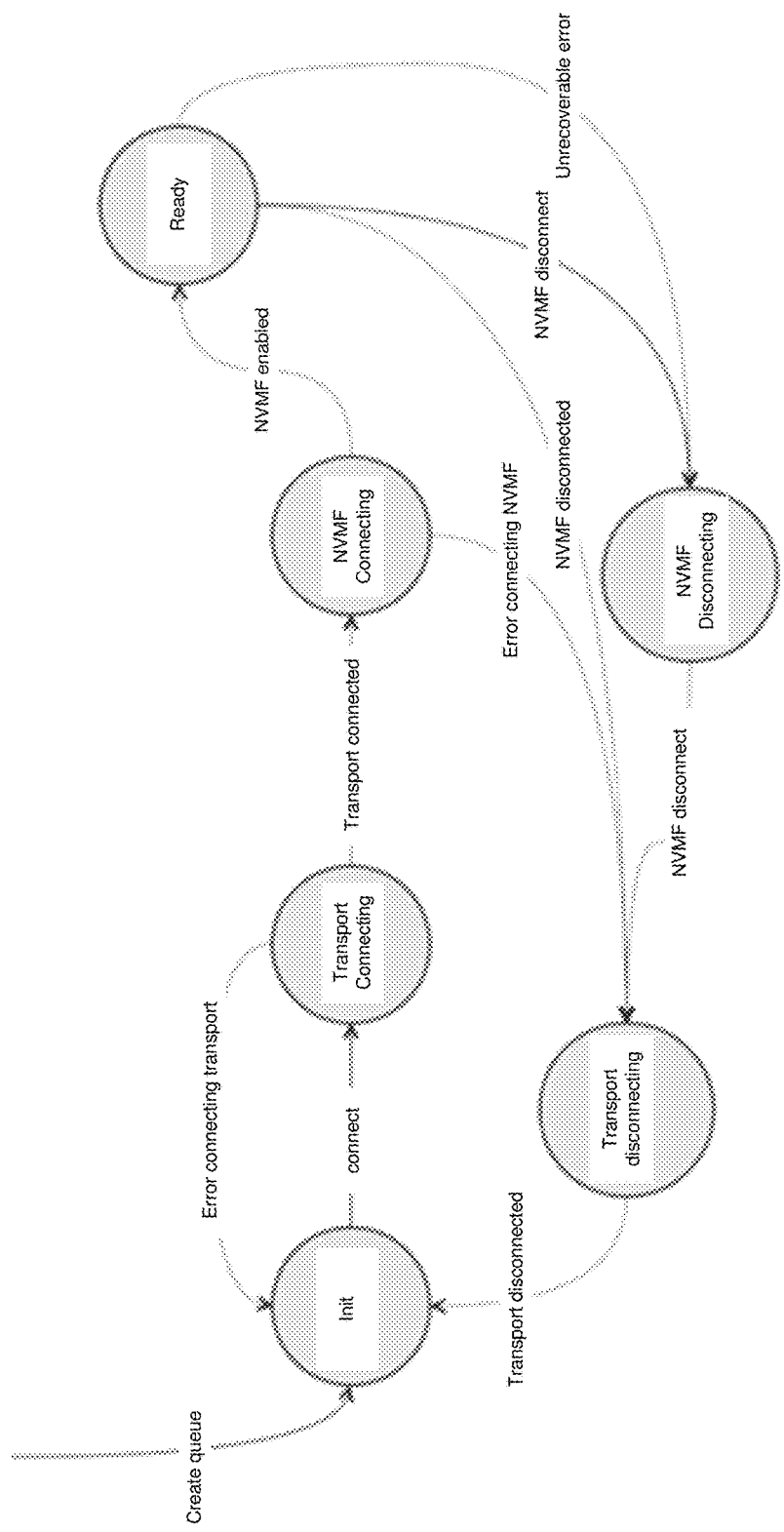
FIG. 10 is an example diagrammatic view of a queue state machine used by a library process according to one or more example implementations of the disclosure.

NVMe queue—this may contain its state machine (as shown in the example queue state machine 1000 implementation of FIG. 10 discussed further below) and required buffers, linked to lower level (transport) queue.

Regarding NVMe core functionality, in some implementations, library process 10 may link 410 (e.g., via the NVMe protocol layer) a namespace to a controller to access the NVMe storage device. For example: Attach namespace—This may attach the namespace asynchronously. For instance, the namespace may be linked to a specific controller. If the required controller does not exist, it may create one and may make the namespace object pointing to this controller. The user may get a handle for this open instance.

NVMe core attach complete—this may call a user callback when the open device is completed. The user may get the handle to identify which device has opened.

NVMe core detach namespace—this may detach the namespace object and if this is the last namespace object which points to its controller, the controller may also be destroyed.

NVMe core submit—this may construct NVMe IOs and submit them and a lower layer controller.

NVMe core poll—this may poll the lower layer for completions in all the controllers and may return each one to the upper layer. The completion may include the associated command ID and status.

Create controller—this may establish a connection between the host and the target. It may also request the lower layer to create at least an admin queue and optional IO queues determined by topology and arguments. Controllers without IO queues are usually used for discovery subsystems. The controller may be declared as "READY" when all queues will be in the "READY" state.

Destroy controller—this may call the lower layer to destroy queues associated with the controller. If applicable, this may send NVMF disconnect command before, and/or may disconnect the transport layer (e.g., socket/RDMA connection).

Figure 9:
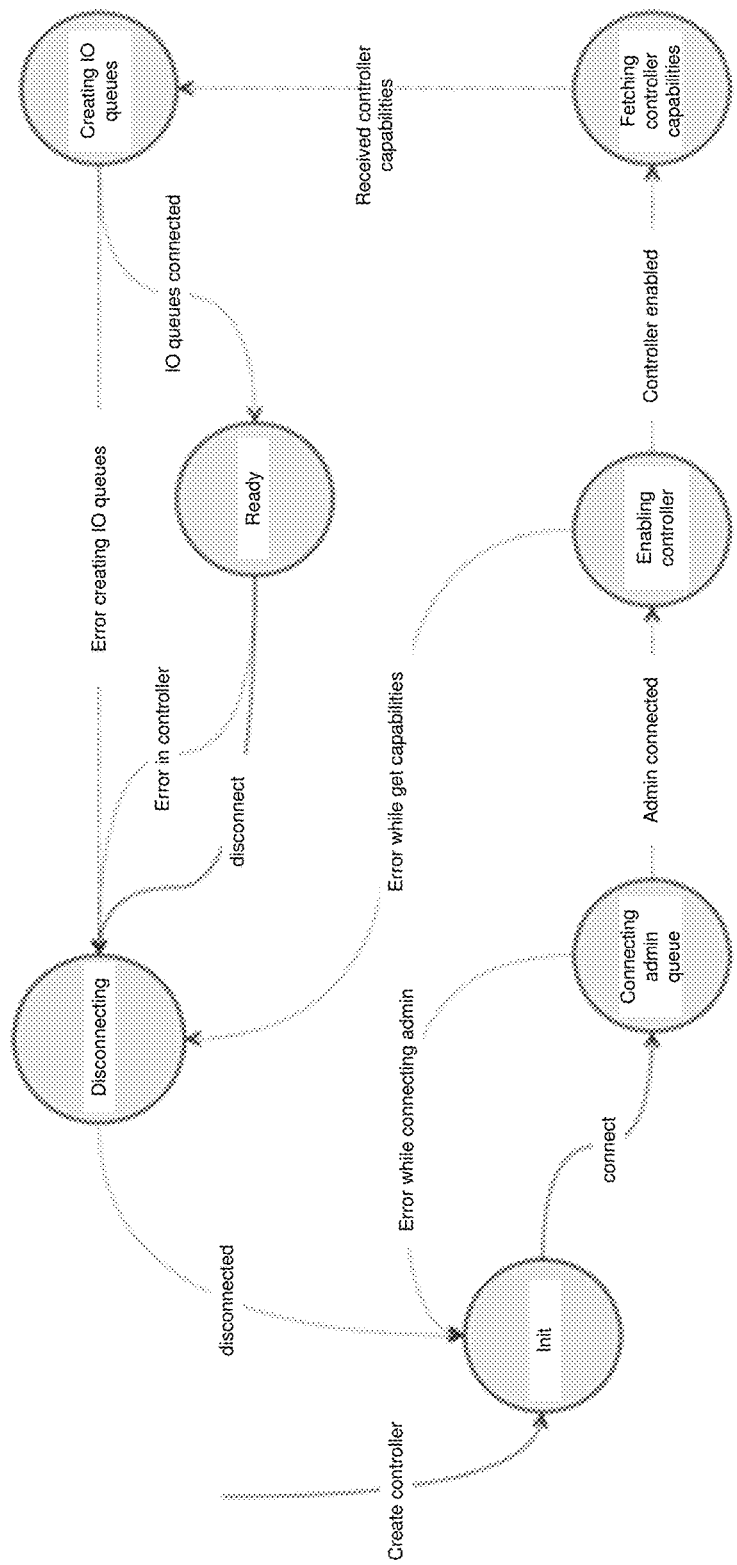
FIG. 9 is an example diagrammatic view of a controller state machine used by a library process according to one or more example implementations of the disclosure.

Referring to the example implementation of FIG. 9, an example of a controller state machine 900 associated with library process 10 is shown, and described below:

Init—this may be the initial state of the object.

Connecting admin queue—this may create a queue requested from the transport layer, waiting for queue establishment.

Enabling controller—this may be where the initial state for the controller in the remote target is disabled. This may enable the controller which allow the system to configure it (e.g., create queues, etc.).

Fetching controller capabilities—this may fetch capabilities before creating queues. This may allow validation of capabilities before trying to configure it (e.g., maximum queue depth).

Creating IO queues—this may create IO queues by the transport layer.

Ready—this may be where all queues are connected, and the controller may be ready to receive IOs from the upper layer.

Disconnecting—this may disconnect all queues from the remote target, and where command submission is not allowed.

Controller keep-alive—in some implementations, when connecting to a controller, there may be determined a keep-alive time out interval (KATO). The controller should get keep-alive commands before the timer expired, or it may cause a disconnection of all queues associated with the controller. Also, the host should get keep-alive messages from time to time to keep the connection. If the host does not get a keep alive message before its timer expired, it may disconnect the controller (discussed further below).

Referring to the example implementation of FIG. 10, an example of a queue state machine 1000 associated with library process 10 is shown, and described below:

Init—this may be the initial state of the NVMe core queue object.

Transport Connecting—library process 10 may move to this state after a connection request is sent to the transport layer, and may move to the next step after the transport layer is notified that the connection has been established or there is an error.

NVMF Connecting—after receiving the "transport connected" event, the queue may submit the "NVMF connect" command and move into the "NVMF Connecting" state. This may be the stage when the NVMF protocol is becoming aware of the connection.

Ready—this may be where the NVMe queue is connected and now the queue is ready to submit IOs. Also, in this state, if the user tries to submit more commands than the queue depth allows, the queue state may still be "Ready", but the user may receive an error while trying to submit too many commands.

NVMe Disconnecting—this may submit a "transport disconnect" command to the target to terminate the connection gracefully.

Transport Disconnecting—this may disconnect the transport layer, and abort in-flight commands.

Regarding error handling, in an example case where it is determined that there is an error in the connection of one or more controller queues, the controller may change its state to "NVMF disconnecting" and when the state returns to "init" the controller may be reconnected. If the reconnect is done successfully the state may be changed to "ready".

There may be a limited number of reconnect attempts that the controller may try. If it exceeds this number, an error may be handled by a higher layer.

Figure 11:
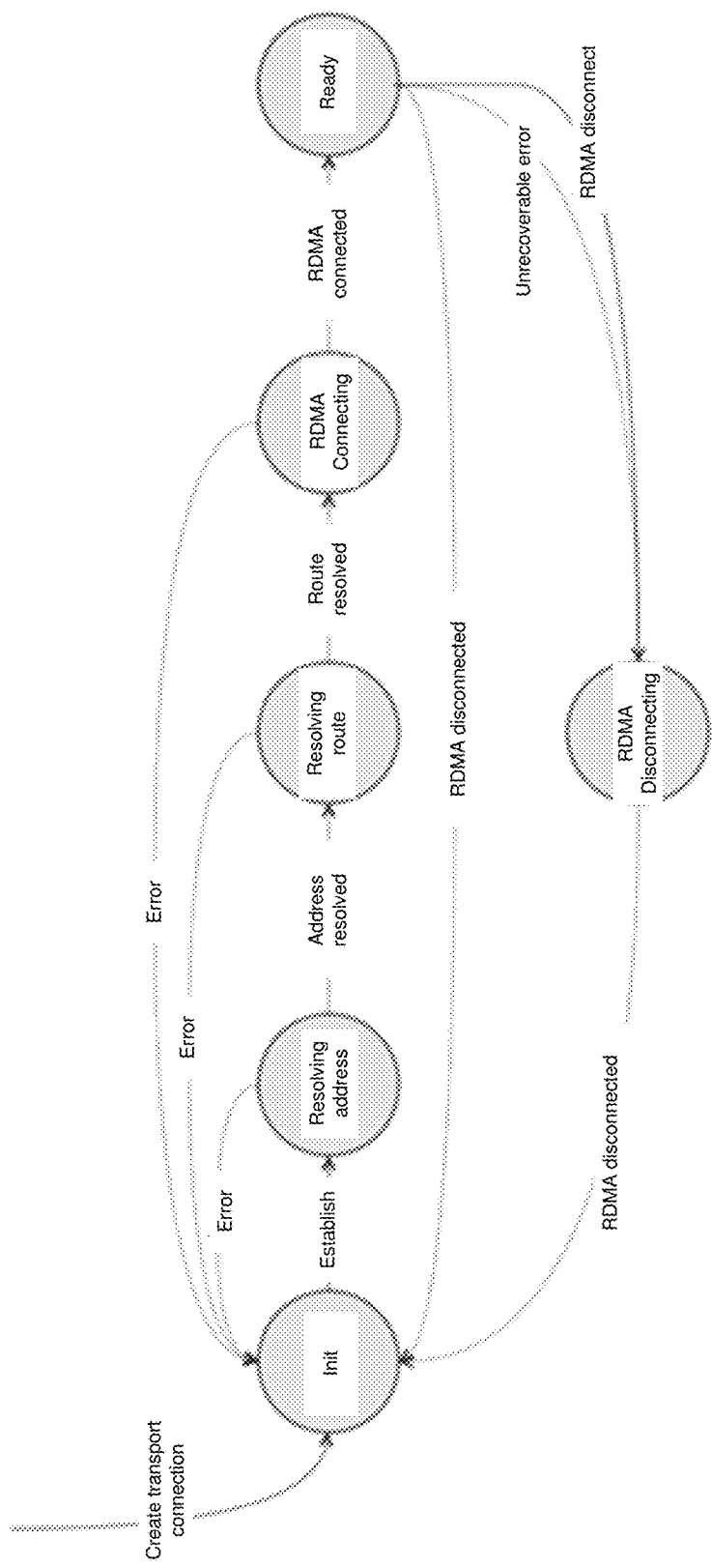
FIG. 11 is an example diagrammatic view of a RDMA queue state machine used by a library process according to one or more example implementations of the disclosure.

Referring to the example implementation of FIG. 11, an example of a RDMA queue state machine 1100 of the MVMeOF RDMA layer associated with library process 10 is shown, and described below:

Init—this may be where an object is initialized, and resources have been allocated.

Resolving Address—this may validate the destination (and optionally the source) address and choose an interface with which the connection will be established.

Resolving Route—this may resolve the route to the target address. RDMA Connecting—this may connect to a remote QP and attach to the local QP.

Ready—this may be where the QP is ready to post and receive work requests.

RDMA Disconnecting—this may disconnect the local and remote QP.

Regarding the NVMeOf RDMA layer functionality, in some implementations, creating the NVMe RDMA queue may include library process 10 creating 412 (e.g., via the NVMe-over-RDMA layer) an RDMA queue. For example, when creating the NVME queue, the underlined RDMA layer may create an RDMA queue and may establish a connection with the target. In some implementations, library process 10 may destroy 414 (e.g., via the NVMe-over-RDMA layer) the RDMA queue. For example, by destroying the RDMA queue, this may close the connection with the target and release all QP related resources (e.g., RDMA QP, CQ, ID, etc.). In some implementations, library process 10 may submit 416 (e.g., via the NVMe-over-RDMA layer) an RDMA work request associated with the IO request to the RDMA queue. For example, this may submit the RDMA work request to the target. The command may fail if the queue is full, and the upper layers should handle such a case.

In some implementations, completion may be polled from the queue. For example, this may poll the QP for work completions, and may return only the NVMe completion message from the received work completion. Regarding events, the RDMA layer may manage the connection states. If there will be changes in the connection state, it may notify the NVME queue.

Regarding the queue topology, in some implementations, this may include each user block device connected to one or more IO queues which are used to submit an IO to the hardware. Multiple queue topologies may be implemented, where each one may have its advantages and disadvantages, but comparing topologies is out of the scope of the present disclosure. In some implementations, the number of queues per controller and their affinity may be based upon, at least in part, e.g., (1) queue per NUMA node, (2) queue per core, and (3) queue per namespace, as well as (4) the number of namespaces per controller. Regarding configuration, the global configurable parameters of the disclosed library may be configured hard-coded during compilation time or loaded from configuration file in run-time.

Regarding the environment layer, this may provide cross-platform functionality, enabling the library to be linked with multiple platforms. Every platform may provide the environment API's implementation. The example functionalities may include, e.g.: (1) memory allocation and release, (2) logging, (3) threads, (4) truck/thread local storage, (5) semaphores, and (6) lock mechanisms (e.g., Mutex, spin-lock, etc.).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claied is:
1. A computer-implemented method comprising:
 exposing, by a user block layer of a computing device, a storage device as a block device to an application associated with an IO request, wherein the user block layer includes an interface layer exposing the storage device to the application, exposing a unified API for all supported block device back ends, and implementing common mechanisms for block device back ends;
 obtaining, by the user block layer, an IO descriptor list and a destination namespace associated with the IO request, wherein each IO descriptor of the IO descriptor list includes one or more of a command ID, and IO vector, and an op-code;
 pre-registering, by the user block layer, application memory used for IO data associated with the IO request, wherein pre-registering the application memory occurs before processing the IO request and includes
  pinning physical memory within the application memory and
  preparing a virtual to physical address translation;
 exposing, by a Non-Volatile Memory Express (NVMe) protocol layer of the computing device, a NVMe storage device associated with the IO request to the user block layer; and creating, by a NVMe-over-Remote Direct Memory Access (RDMA) layer of the computing device, a NVMe RDMA queue for the IO request to be processed.

2. The computer-implemented method of claim 1 further comprising linking, by the NVMe protocol layer, a namespace to a controller to access the NVMe storage device.

3. The computer-implemented method of claim 1 wherein creating the NVMe RDMA queue includes creating, by the NVMe-over-RDMA layer, an RDMA queue.

4. The computer-implemented method of claim 3 further comprising destroying, by the NVMe-over-RDMA layer, the RDMA queue.

5. The computer-implemented method of claim 3 further comprising submitting, by the NVMe-over-RDMA layer, an RDMA work request associated with the IO request to the RDMA queue.

6. A computer program product residing on a non-transitory computer readable storage medium having a plurality of instructions stored thereon which, when executed across one or more processors, causes at least a portion of the one or more processors to perform operations comprising:
   exposing, by a user block layer of a computing device, a storage device as a block device to an application associated with an IO request, wherein the user block layer includes an interface layer exposing the storage device to the application, exposing a unified API for all supported block device back ends, and implementing common mechanisms for block device back ends;
   obtaining, by the user block layer, an IO descriptor list and a destination namespace associated with the IO request, wherein each IO descriptor of the IO descriptor list includes one or more of a command ID, and IO vector, and an op-code;
   pre-registering, by the user block layer, application memory used for IO data associated with the IO request, wherein pre-registering the application memory occurs before processing the IO request and includes
      pinning physical memory within the application memory and
      preparing a virtual to physical address translation;
   exposing, by a Non-Volatile Memory Express (NVMe) protocol layer of the computing device, a NVMe storage device associated with the IO request to the user block layer; and
   creating, by a NVMe-over-Remote Direct Memory Access (RDMA) layer of the computing device, a NVMe RDMA queue for the IO request to be processed.

7. The computer program product of claim 6 wherein operations further comprise linking, by the NVMe protocol layer, a namespace to a controller to access the NVMe storage device.

8. The computer program product of claim 6 wherein creating the NVMe RDMA queue includes creating, by the NVMe-over-RDMA layer, an RDMA queue.

9. The computer program product of claim 8 wherein the operations further comprise destroying, by the NVMe-over-RDMA layer, the RDMA queue.

10. The computer program product of claim 8 wherein the operations further comprise submitting, by the NVMe-over-RDMA layer, an RDMA work request associated with the IO request to the RDMA queue.

11. A computing system including one or more processors and one or more memories configured to perform operations comprising:
   exposing, by a user block layer of a computing device, a storage device as a block device to an application associated with an IO request, wherein the user block layer includes an interface layer exposing the storage device to the application, exposing a unified API for all supported block device back ends, and implementing common mechanisms for block device back ends;
   obtaining, by the user block layer, an IO descriptor list and a destination namespace associated with the IO request, wherein each IO descriptor of the IO descriptor list includes one or more of a command ID, and IO vector, and an op-code;
   pre-registering, by the user block layer, application memory used for IO data associated with the IO request, wherein pre-registering the application memory occurs before processing the IO request and includes
      pinning physical memory within the application memory and
      preparing a virtual to physical address translation;
   exposing, by a Non-Volatile Memory Express (NVMe) protocol layer of the computing device, a NVMe storage device associated with the IO request to the user block layer; and
   creating, by a NVMe-over-Remote Direct Memory Access (RDMA) layer of the computing device, a NVMe RDMA queue for the IO request to be processed.

12. The computing system of claim 11 wherein the operations further comprise linking, by the NVMe protocol layer, a namespace to a controller to access the NVMe storage device.

13. The computing system of claim 11 wherein creating the NVMe RDMA queue includes creating, by the NVMe-over-RDMA layer, an RDMA queue.

14. The computing system of claim 13 wherein the operations further comprise destroying, by the NVMe-over-RDMA layer, the RDMA queue.

15. The computing system of claim 13 wherein the operations further comprise submitting, by the NVMe-over-RDMA layer, an RDMA work request associated with the IO request to the RDMA queue.

* * * * *